United States Patent
Heise

(10) Patent No.: US 11,605,046 B2
(45) Date of Patent: Mar. 14, 2023

(54) SHIPMENT DISTRIBUTION SYSTEM AND METHOD FOR DISTRIBUTION OF GOODS SHIPMENTS

(71) Applicant: Graphmasters SA, Spiegel b. Bern (CH)

(72) Inventor: Sebastian Heise, Rahden (DE)

(73) Assignee: GRAPHMASTERS SA, Bern (CH)

( * ) Notice: Subject to any disclaimer, the term of this patent is extended or adjusted under 35 U.S.C. 154(b) by 665 days.

(21) Appl. No.: 16/564,284

(22) Filed: Sep. 9, 2019

(65) Prior Publication Data

US 2020/0082323 A1 Mar. 12, 2020

(30) Foreign Application Priority Data

Sep. 12, 2018 (CH) .................................. CH1079/18
Oct. 23, 2018 (EP) .................................... 18405021

(51) Int. Cl.
*G06Q 10/08* (2012.01)
*G06Q 10/083* (2023.01)
(Continued)

(52) U.S. Cl.
CPC ......... *G06Q 10/083* (2013.01); *G01C 21/343* (2013.01); *G06Q 10/047* (2013.01);
(Continued)

(58) Field of Classification Search
CPC .... G06Q 10/083; G06Q 10/087; G06Q 50/28; G06Q 10/0833; G06Q 10/08;
(Continued)

(56) References Cited

U.S. PATENT DOCUMENTS 9,129,525 B2 9/2015 Frisch et al.
2011/0258135 A1* 10/2011 Paul ....................... G06Q 10/08
705/338

(Continued)

FOREIGN PATENT DOCUMENTS

DE 102008063377 A1 7/2010
DE 102011107881 A1 1/2013
WO 2017164914 A1 9/2017

OTHER PUBLICATIONS

The logistics of logistics: From manufacturer to consumer. (Aug. 27, 2018). The Hindustan Times Retrieved from https://dialog.proquest.com/professional/docview/2093218994?accountid=131444 (Year: 2018).*

(Continued)

*Primary Examiner* — Michael P Harrington
(74) *Attorney, Agent, or Firm* — Dilworth IP, LLC

(57) ABSTRACT

A shipment distribution system and method are presented. The system includes a plurality of goods shipments, one or more delivery vehicles, a tour planning system and a navigation system operating in each delivery vehicle and communicatively linked to the tour planning system. Each goods shipment has a destination address for delivery. Each of the delivery vehicles has a cargo area divided into loading zones. The tour planning system stores a volume of the cargo area of each delivery vehicle. The tour planning system transmits to the navigation system calculated tour routes to deliver each of the goods shipments to corresponding destination addresses according to the positions of the goods shipments in the cargo area and the destination address. Upon arrival at the destination address for each goods shipment, the tour planning system indicates the loading zone in the cargo area storing the goods shipment for delivery.

19 Claims, 5 Drawing Sheets

(51) Int. Cl.
*G01C 21/34* (2006.01)
*G06Q 10/047* (2023.01)
*G08G 1/0968* (2006.01)
*G06Q 50/28* (2012.01)

(52) U.S. Cl.
CPC . *G08G 1/096827* (2013.01); *G08G 1/096844* (2013.01); *G06Q 50/28* (2013.01)

(58) Field of Classification Search
CPC ......... G06Q 10/08355; G06Q 10/0832; G06Q 50/30; G06Q 10/0834; G06Q 10/0835; G06Q 10/047; G06Q 10/04; G01C 21/34; G01C 21/3415; G01C 21/343; G08G 1/096827; G08G 1/096844
See application file for complete search history.

(56) References Cited

U.S. PATENT DOCUMENTS

| | | | |
|---|---|---|---|
| 2013/0304349 A1* | 11/2013 | Davidson | G08G 1/0112 701/99 |
| 2015/0210199 A1* | 7/2015 | Payne | G01S 19/14 701/1 |
| 2015/0248638 A1 | 9/2015 | Hergarten | |
| 2016/0047646 A1 | 2/2016 | Ochsendorf et al. | |
| 2017/0140329 A1* | 5/2017 | Bernhardt | G06Q 50/28 |
| 2017/0262790 A1* | 9/2017 | Khasis | G08G 1/012 |
| 2018/0293884 A1 | 10/2018 | Liu et al. | |
| 2018/0341918 A1* | 11/2018 | Raut | G08G 1/202 |
| 2019/0206244 A1 | 7/2019 | Takahashi | |
| 2019/0228375 A1* | 7/2019 | Laury | G05D 1/0088 |

OTHER PUBLICATIONS

Non-Final Office Action issued in U.S. Appl. No. 16/214,823, dated Apr. 16, 2020.
Extended European Search Report issued in corresponding European Patent Application No. 18405021.9, dated Jun. 14, 2019.
Extended European Search Report issued in corresponding European Patent Application No. 18405020.1, dated Apr. 29, 2019.
"Madrid City Council choose Kapsch on intelligent mobility solution"; ITS International; www.itsinternational.com/categories/utc/news/madrid-city-council-chooses-kapsch-on-intelligent-mobility-solution/; accessed on Feb. 4, 2019, 1 pg.
"Kapsch TrafficCom: 'The city is not made for cars'"; ITS International; www.itsinternational.com/categories/utc/features/kapsch-trafficcom-the-city-is-not-made-for-cars/; accessed on Feb. 4, 2019, 4 pp.
www.kapsch.net/ktc/Portfolio/Intelligent-Mobility-Solutions/Traffic-Management/EcoTrafix-for-Cities; accessed on Feb. 4, 2019; 4 pp.

* cited by examiner

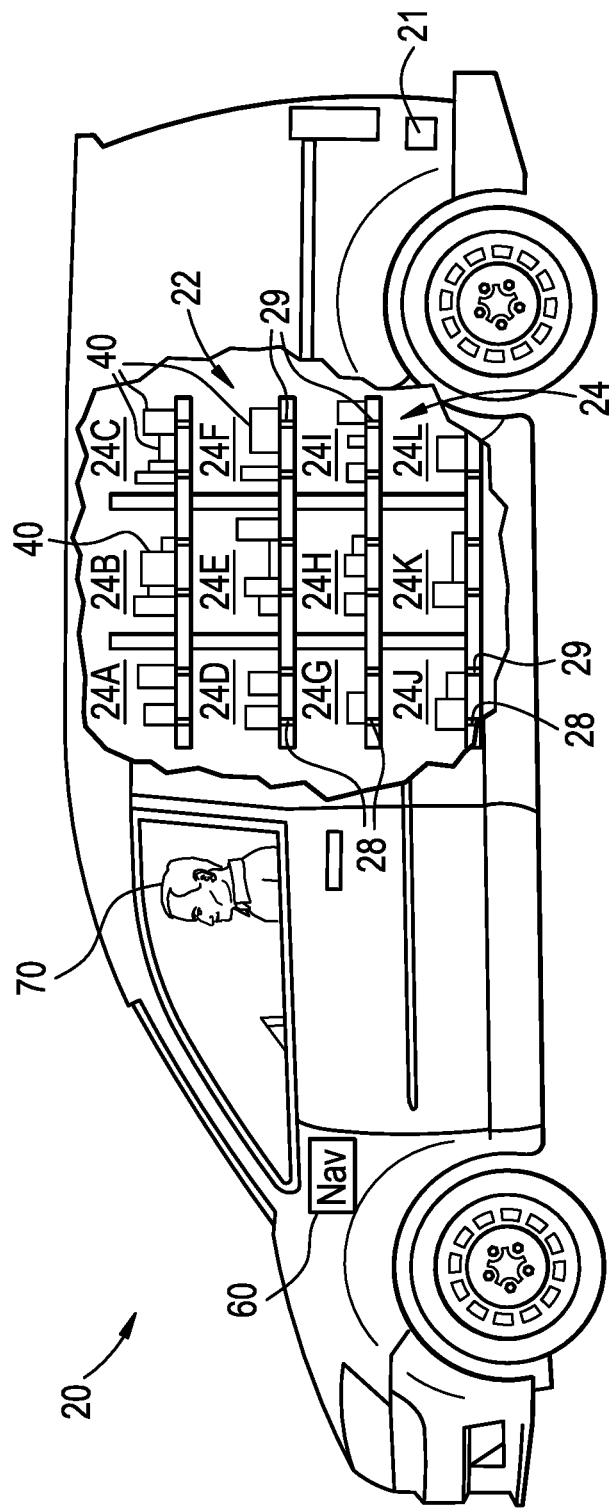

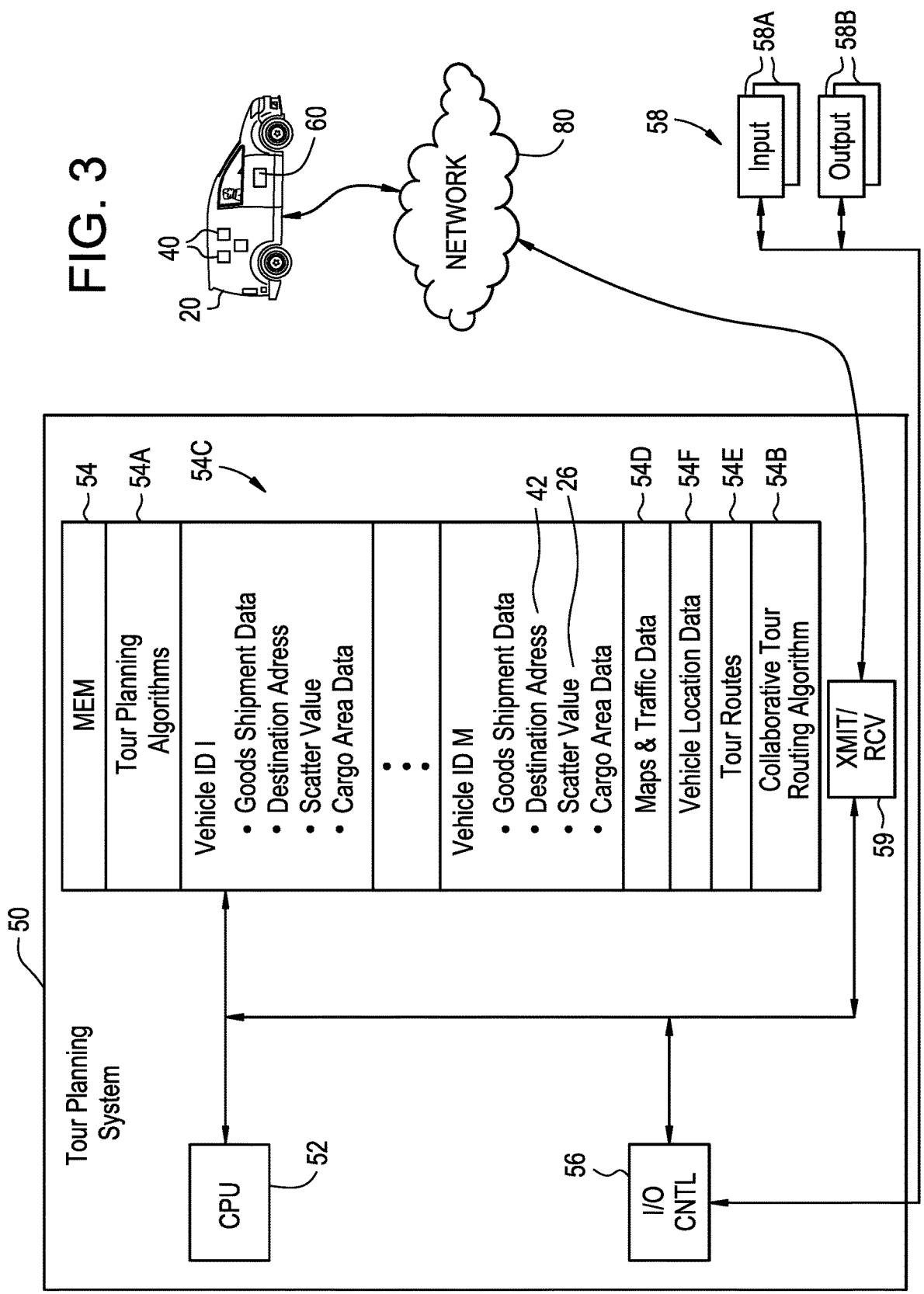

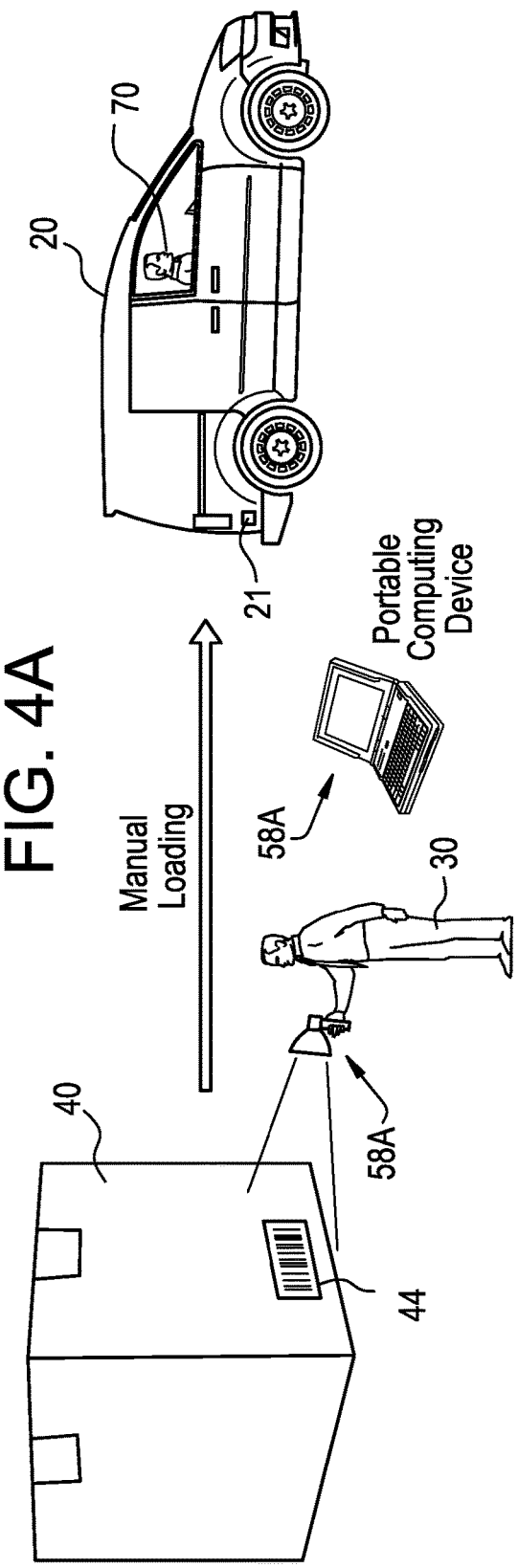
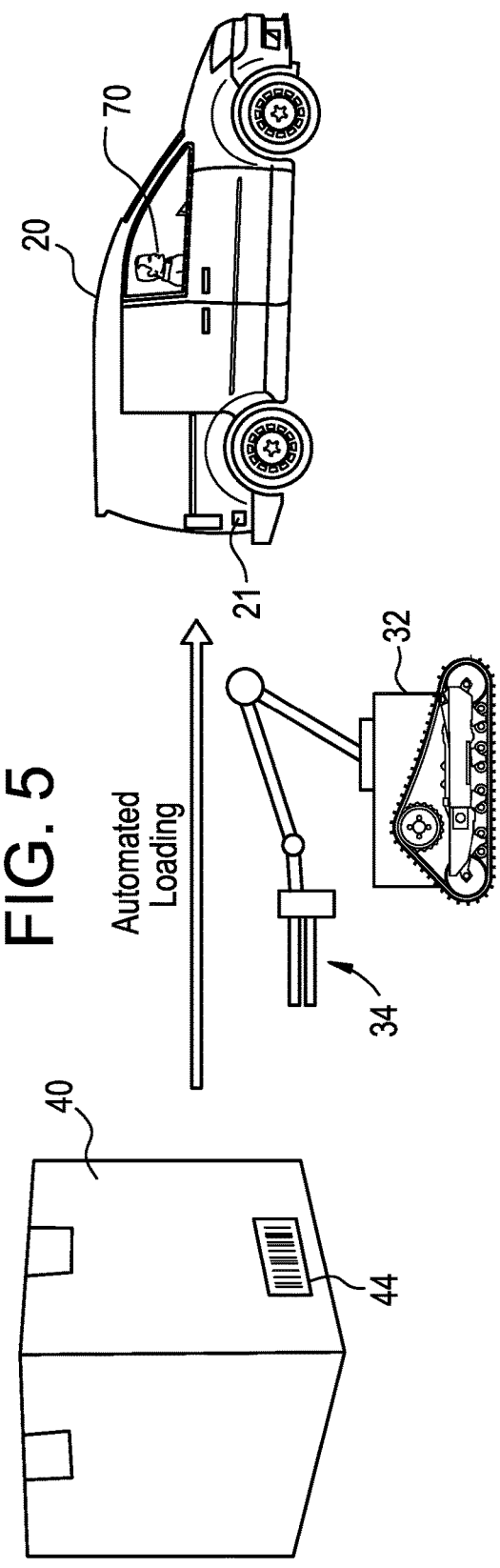

SHIPMENT DISTRIBUTION SYSTEM AND METHOD FOR DISTRIBUTION OF GOODS SHIPMENTS

CROSS-REFERENCE TO RELATED APPLICATIONS

This patent application claims priority to Swiss Patent Application No. 1079/18, filed on Sep. 12, 2018, and European Patent Application No. 18405021.9, filed on Oct. 23, 2018. The disclosures of these patent documents are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to a system and a method for distributing goods shipments with one or more transport or delivery vehicles, including a fleet of transport or delivery vehicles. In particular, the present invention is directed to systems and methods for assigning loading zones within a cargo area of each transport or delivery vehicle, and optimizing a delivery route of each delivery vehicle in accordance with the assigned loading zones and the delivery address for the goods shipments within the cargo area of each delivery vehicle.

2. Description of Related Art

This description of related art is provided to generally present the context of the present invention. Unless otherwise indicated, information described in this section is not prior art to the claimed invention of this patent document, and is not admitted to be prior art by inclusion therein.

Generally speaking, the distribution of goods shipments that includes the scheduled loading of transport or delivery vehicles, the scheduled arrival at destination addresses, and the scheduled unloading of the goods shipments, involves considerable logistical time and effort. Improvements in the above parameters can result in significant savings in time for the distribution of such goods shipments. For example, perceived deficiencies in conventional systems is that minor changes in the order situation during the allocation of orders with goods shipments to different tour routes or vehicles can necessitate major changes in the distribution pattern. It is therefore preferable to break down the tour routes between the available delivery vehicles and goods shipments only just before the start.

Accordingly, at least one aim of the present invention is to provide improved systems and methods that provide an advantageous shipment distribution system and method for distributing goods shipments.

SUMMARY OF THE INVENTION

The present invention resides in a system and a method as set forth in the independent claims, with embodiments described in the dependent claims.

In one aspect of the present invention, a shipment distribution system includes a plurality of goods shipments, one or more delivery vehicles, a tour planning system and a navigation system operating in each of the delivery vehicles and communicatively linked to, or integrated with, the tour planning system. Each of the goods shipments has a destination address for delivery of the goods shipment. Each of the delivery vehicles has a cargo area divided into a plurality of loading zones. Each of the loading zones is capable of storing at least one or more of the plurality of goods shipments therein. The tour planning system includes a processor, memory operably coupled to the processor, and input and output devices operably coupled to the processor. The memory stores a volume of the cargo area of each of the one or more delivery vehicles including identification information of the goods shipments, and identification information of the loading zones of the cargo area. The tour planning system is configured to transmit to the navigation system tour route information including calculated tour routes to deliver each of the goods shipments to corresponding destination addresses according to the positions of the goods shipments in the cargo area and the destination address data. Upon arrival at the destination address for each goods shipment, the tour planning system indicates the loading zone in the cargo area storing the goods shipment for delivery.

In one embodiment, the tour planning system of the shipment distribution system further includes an algorithm stored in the memory and executed by the processor to calculate an optimised tour route on the basis of the positions of the goods shipments in the cargo area and the destination addresses for the goods shipments.

In one embodiment, the navigation system changes the tour route according to the traffic situation on the calculated tour route.

In still another embodiment, the tour planning system indicates a position of the goods shipments in the loading zones electronically by activation of an indicating unit corresponding to the loading zone.

In one embodiment, the tour planning system stores positions of the goods shipments in the loading zones of each of the plurality of delivery vehicles and calculates the tour routes of each of the plurality of delivery vehicles to optimize travel times of each of the plurality of delivery vehicles.

In one embodiment, the positions of the goods shipments in the loading zones of the cargo area are specified by a loader, and data on the positions of the goods shipments in the loading zones are input by the loader using a reader that reads codes attached to each of the loading zones and transmits the data to the tour planning system.

In yet another embodiment, the shipment distribution system includes at least one electronic display unit with an input device with which a loader specifies the positions of the goods shipments in the loading zones of the cargo area at the display unit using the input device.

In still another embodiment, the shipment distribution system further includes a robot system into which predetermined data on the positions of the goods shipments can be entered. The robot system operates to position the goods shipments at specified positions in the loading zones of the cargo area. In one embodiment, the robot system operates to selectively unload the goods shipments from the specified positions in the loading zones of the cargo area at the respective destination addresses with grippers.

In another aspect of the present invention, a method for distribution of goods shipments is presented. The method comprises steps of providing one or more delivery vehicles, storing, in a tour routing system, a volume of a cargo area of each of the delivery vehicles, the volume including a plurality of goods shipments and a destination address for each of the goods shipments, dividing, by the tour routing system, the cargo area of each of the delivery vehicles into loading zones, and assigning the volume to positions within the loading zones, planning, by the tour routing system, a tour route for each of the delivery vehicles according to the positions of the goods shipments within the loading zones and the destination addresses of the goods shipments, and transmitting from the tour routing system the tour routes for each of the delivery vehicles to a navigation system operating within each delivery vehicles.

In one embodiment, the method further includes upon arrival at the destination address for each goods shipment, indicating, by the tour routing system, the loading zone in the cargo area storing the goods shipment for delivery.

In still another embodiment, the method further includes employing, by the tour routing system, a collaborative tour routing algorithm which, in response to changing external influences, traffic situation, delivery order situation, and a current location and anticipated next destination location of a corresponding one of the delivery vehicles, revises the tour route for the corresponding delivery vehicle to optimize delivery time, and transmitting the revised tour route to the navigation system operating within the corresponding delivery vehicle.

BRIEF DESCRIPTION OF THE DRAWINGS

The features and advantages of the present invention will be better understood when the Detailed Description of the Preferred Embodiments given below is considered in conjunction with the figures provided, wherein:

FIG. 2 is a simplified, partially cross-section view illustrating a cargo area of the one or more delivery vehicles that transport the goods shipments to respective destination addresses along tour routes determined by a tour planning system within the shipment distribution system of FIG. 1, in accordance with one embodiment of the present invention;

FIG. 3 is a simplified schematic block diagram illustrating hardware components of a computer system configured and operating to execute algorithms, routines and methods of the tour planning system within the shipment distribution system of FIG. 1, in accordance with one embodiment of the present invention;

FIGS. 4A and 4B illustrate a process for loading goods shipments into a cargo area of a delivery vehicle within the shipment distribution system of FIG. 1, in accordance with one embodiment of the present invention; and FIG. 5 illustrate a process for automated loading goods shipments into a cargo area of a delivery vehicle within the shipment distribution system of FIG. 1, in accordance with one embodiment of the present invention.

In these figures, like structures are assigned like reference numerals, but may not be referenced in the description for all figures.

DETAILED DESCRIPTION OF PREFERRED EMBODIMENTS

Figure 1:
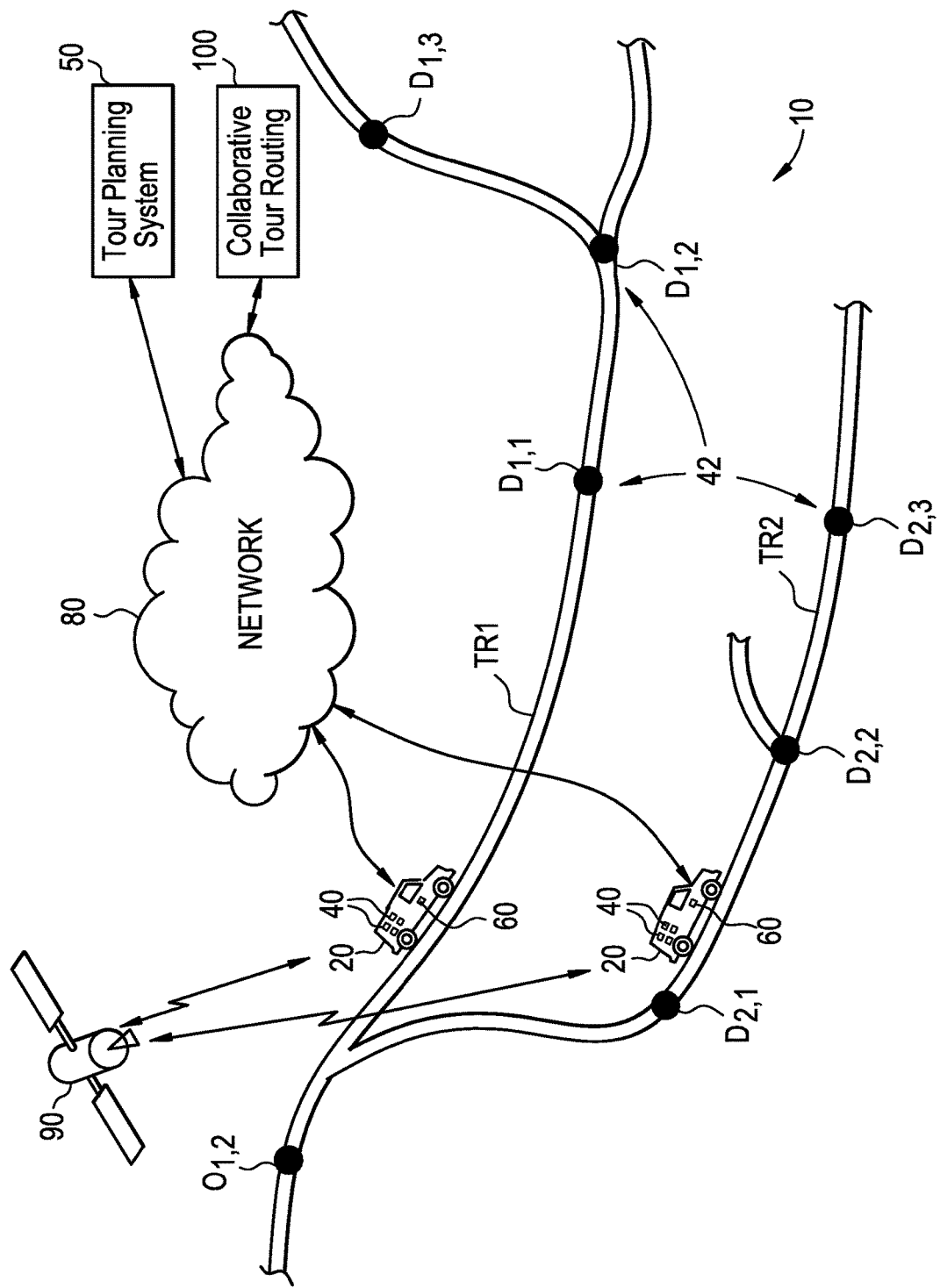
FIG. 1 is a simplified schematic diagram illustrating a configuration of a shipment distribution system for delivery of goods shipments to destination addresses by means of one or more transport or delivery vehicles, in accordance with one embodiment of the present invention.

The present invention is described below by way of one or more example embodiments and by referring to the drawing.

In one embodiment, the present invention provides a shipment distribution system for the delivery of goods shipments by means of at least one, and preferably, one or more transport or delivery vehicles. The system includes a tour planning system operatively or communicatively linked to, integrated or connected with, a navigation system in each of the delivery vehicles. In one embodiment, the tour planning system is designed to electronically store in its memory, a volume or contents of a cargo area of each of the delivery vehicles, to divide the cargo area into several loading zones, to store destination address data of goods shipments, and to plan a tour route or delivery route for each of the delivery vehicles according to positions (e.g., within the loading zones) of the goods shipments in the cargo area and the destination address data for the goods shipments. In one embodiment, the tour planning system transmits the tour route to the navigation system within each of the delivery vehicles to aid and/or positively influence journey times and/or delivery routes. In one embodiment, a method for the distribution of goods shipments by means of at least one, and preferably, one or more delivery or transport vehicles comprises process steps of: electronic storage of a volume or content of a cargo area of each of the delivery vehicles, division of the cargo area into several loading zones, planning of a tour route or delivery route for each of the delivery vehicles according to the positions (e.g., within the loading zones) of the goods shipments and a destination address of goods shipments, and transmission of the tour route to the navigation system within each of the delivery vehicles to aid and/or positively influence journey times and/or delivery routes.

Embodiments of the present invention are described in the appended claims. It should be appreciated that the present invention is described below by means of one or more example embodiments.

FIG. 1 illustrates a simplified schematic diagram of a shipment distribution system 10 for delivery of a plurality of goods shipments 40 from an origin to destination addresses 42, shown in FIG. 1 as $O_{1,2}$, and $D_{1,1}$, $D_{1,2}$, $D_{1,3}$, etc., respectively, by means of at least one, and preferably, one or more transport or delivery vehicles 20. The shipment distribution system 10 includes a tour planning system 50. In one embodiment, illustrated in FIG. 3 and described in detail below, the tour planning system 50 is implemented as a computer system with corresponding software, and is configured and operates in accordance with one embodiment of the present invention to implement techniques, as described herein, for collecting, storing, computing, displaying and communicating delivery vehicle locations, volume or content of cargo areas of the transport or delivery vehicles, data and information on goods shipments, destination addresses, delivery or tour routes, roadways, and closures or congestion thereof, and the like. The tour planning system 50 is operatively or communicatively linked to, integrated or connected with, a navigation system 60 in each of the one or more delivery vehicles 20.

As shown in FIGS. 1 and 2, in one aspect of the present invention, a volume or content of a cargo area 22 of each the one or more delivery vehicles 20 that transport the goods shipments 40 to respective destination addresses 42 is stored in the tour planning system 50. In one embodiment, each of the delivery vehicles 20 is assigned a unique and readable vehicle identification code 21, and the cargo areas 22 of each of the delivery vehicles 20 is divided into one or more distinct loading zones 24. For example, in one embodiment illustrated in FIG. 2, the cargo area 22 of the delivery vehicle 20 is divided into twelve (12) loading zones 24 (e.g., 24A to 24L). It should be appreciated that while FIG. 2 illustrates uniform, distinct loading zones 24 configured in the vehicle 20, it is within the scope of the present invention that one or more of the delivery vehicles 20 may have loading zones 24 configured to accommodate various sized and/or type of goods shipments 40 including, but not limited to boxes, crates, drums, pallets, dry and refrigerated storage, and other conventional or custom packaging or shipping containers. In one embodiment, the processor (e.g., CPU 52 described below) implements a scatter function within the tour planning system 50 which determines and assigns a scatter value 26 for each goods shipment 40 such that goods shipments 40 belonging to a same shipment or destination address 42 are assigned the same scatter value 26. In one embodiment, the scatter values 26 are distributed uniformly between the loading zones 24. In one embodiment, each of the loading zones 24 (e.g., loading zones 24A to 24L) of the cargo area 22 of each delivery vehicle 20 is selectively identifiable by a visual or auditory indicating unit 28 (e.g., LED light source or speaker providing audio sound) and unique and readable position identification code 29 (e.g., barcode, radio frequency ID (RFID) or quick response (QR) code). As noted above, the destination addresses 42 of the goods shipments 40 to be transported are also stored electronically in the tour planning system 50. As described herein, the tour planning system 50 associates each goods shipment 40, its shipment or destination address 42, and the position identification code 29 for the loading zone 24 to facilitate unloading upon arrival of the delivery vehicle 20 at the destination address 42 to improved logistical time and effort.

As shown in FIG. 3, the tour planning system 50 includes a processor such as a microprocessor or CPU 52, computer-readable storage medium or memory MEM 54, an input-output controller 56 operatively coupled to input and output devices, shown generally at 58, including input devices 58A for facilitating input of data and information to the tour planning system 50 such as a keyboard, a mouse, touch screen, reader of barcodes (e.g., UPC barcodes), RFIDs, or QR codes, or other input device, and output devices 58B for displaying inputted and/or processed data and other information such as a pixel-oriented display device, printer or the like. In one embodiment, MEM 54 stores tour planning algorithms 54A and, optionally, collaborative tour routing algorithms 54B, executed by the CPU 52 in operation of the tour planning system 50, and under unique vehicle identification codes 21, data and information 54C of each vehicle (e.g., vehicle IDs 1 to M) regarding goods shipments 40, shipment or destination address 42 of each shipment 40, scatter value 26 of the goods shipment (if assigned), and the position identification code 29 for the loading zone 24 of each shipment 40. The MEM 54 also stores maps and traffic data 54D, tour routes 54E, vehicle location 54F, and other data and information or parameters used in the tour planning system 50. In one embodiment, the tour planning system 50 includes a transceiver 59 operatively or communicatively linked to, integrated or connected with, or coupled to, a communications network 80 such as the Internet, an intranet, an extranet, or like distributed communication platform for accessing and/or sending and receiving data, information, requests, commands, and otherwise communicating with one or more external devices such as, for example, one or more of navigation system 60 located in one or more of the delivery vehicles 20, over wired and wireless communication connections. It should be appreciated that, in one embodiment, the navigation system 60 includes a similar hardware configuration (e.g., the CPU, memory, input-output controller, input and output devices, and transceiver) as illustrated in FIG. 3.

Figure 4B:
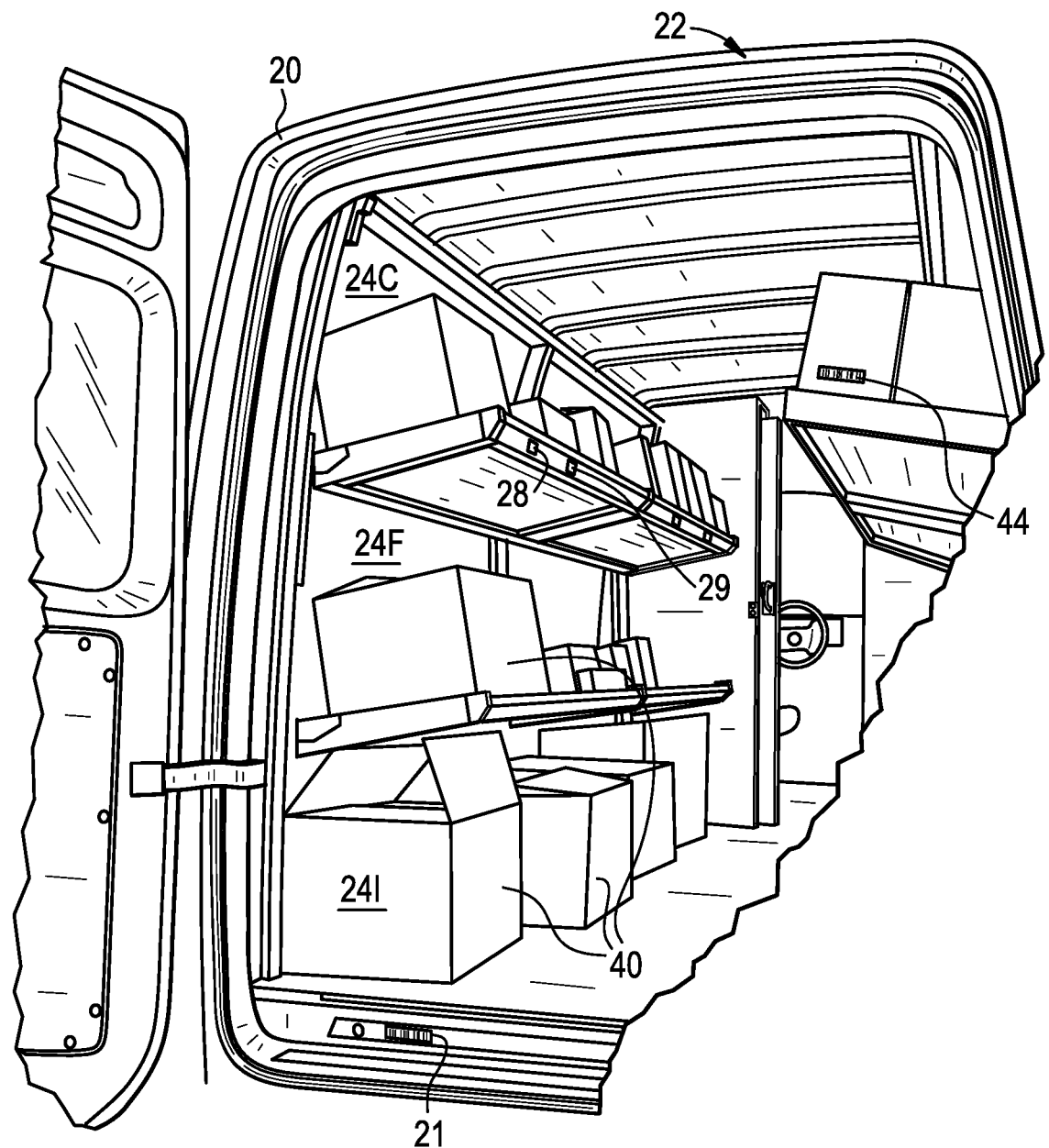

In one embodiment of the present invention, illustrated in FIGS. 4A and 4B, positions of the goods shipments 40 in the loading zones 24 (e.g., 24A to 24L) of the cargo areas 22 of the delivery vehicles 20 are determined by a loader 30. For example, the loader 30 using a reader 58A (e.g., UPC barcode, RFID, QR code reader, or the like) collects goods identification data 44 on the good shipment 40 and the position identification code 29 of where the goods shipment 40 is placed or loaded within the loading zones 24 of an identified delivery vehicle 20 by means of the reader 58A. This data (e.g., goods identification data 44, vehicle identification code 21, and the position identification code 29) is then transmitted to the tour planning system 50 and, as noted above, stored in the MEM 54 thereof.

In another example embodiment, the shipment distribution system 10 includes as an input device 58A to the tour planning system 50, an electronic display unit with input device (e.g., portable computing device such as a laptop, notebook or tablet computer or smartphone) with which a user other than loader 30, specifies the positions (e.g., loading zones 24) of the goods shipments 40 in the cargo area 22 of the delivery vehicle 20 at the display unit using the input device. The user can thus assign the goods shipments 40 to the loading zones 24 of the vehicles 20 at the computer monitor. Each parcel or goods shipment 40 is thus flexibly and unambiguously assigned to a position (e.g., loading zone 24) in a vehicle 20. Alternatively, the tour planning system 50 is designed to specify the positions (e.g., loading zones 24) of the goods shipments 40 in the cargo areas 22 electronically by means of one or more tour planning algorithms. For example, the volumes of the goods shipments 40 and destination addresses 42 are transmitted to the tour planning system 50 which assigns the goods shipments 40 to loading zones 24 in the vehicles 20 according to the volume, destination addresses 42 and one or more tour routes TR determined to optimize travel to and between the destination addresses 42. The positions of the goods shipments 40 calculated by the tour planning system 50 in this dynamic manner are transmitted to the loader(s) 30 of the one or more delivery vehicles 20, for example to electronic tablets or smartphones or other output devices 58B held by the loader(s) 30. In one embodiment, the calculated positions within the loading zones 24 are transmitted to the loader(s) by means of a barcode assignment label printed and affixed to each of the goods shipments 40. The loader(s) 30 then load the goods shipments 40 in the transmitted and specified loading zones 24 of the vehicles 20 in accordance with the tour planning system 50 determined and assigned position in the loading zones 24 of the cargo area 22.

In an alternative embodiment, the shipment distribution system 10 includes a robot system 32 facilitating the actions of the loader 30. In this embodiment the data on the positions (e.g., loading zones 24) of the goods shipments 40 can be determined and input in various ways. The robot system 32 includes grippers 34, which position the goods shipments 40 at the specified positions (e.g., loading zones 24) in the cargo area 22. In this way, the loading process step is automated in combination with the other features of the shipment distribution system and shipment distribution method.

In another aspect of the present invention, the tour planning system 50 proposes that a tour route TR 54E of the at least one and, preferably, one or more delivery vehicles 20, are planned according to the positions/loading zones 24 of the goods shipments 40 in the cargo area 22, and the destination addresses 42 of the goods shipments 40. The planned tour route TR 54E is transmitted by the tour planning system 50 to the navigation system 60 in each of the delivery vehicles 20. Tour routes TRs of a large number of loaded delivery vehicles, or fleet of vehicles, are each transmitted accordingly to the corresponding navigation systems 60 therein. The navigation system 60 of each respective delivery vehicle 20 determines an ideal and efficient tour route TR in accordance with a sequence of anticipated arrivals at and between the destination addresses 42 for loaded good shipments 40 within its corresponding cargo area 22. The proposed tour sequence or route TR 54E can be changed by the navigation system 60, or the tour planning system 50 employing internal collaborative tour routing algorithms 54B, or accessing an external collaborative tour routing system 100, in response to changing external influences, traffic situation, order situation, etc., and a current location and anticipated next destination location of the delivery vehicle 20. In one embodiment, the collaborative tour routing algorithms such as, for example, algorithms employed internally 54B or within the system 100 described below, use collective information including utilization and capacity of roadways to organize traffic by, for example, reserving a specific tour sequence or route TR for each delivery vehicle 20 and sending vehicles with a common or similar destination address along similar but different routes to minimize, if not avoid, conjestion. The navigation system 60 then determines a next stop or destination address 42 for a next goods shipment 40 along the tour sequence or route TR, and signals the load position by, for example, activating the indicating unit 28 for the applicable loading zone 24 of the goods to be unloaded at the destination address 42 to a driver 70 of the delivery vehicle 20 to facilitate more rapid locating and unloading processes.

For example, referring again to FIG. 1, during delivery, the navigation system 60 transmits information pertaining to the planned tour routes TR1 and TR2 of two delivery vehicles 20, from an origin $O_{1,2}$ to a plurality of destination addresses $D_{1,1}$, $D_{1,2}$, and $D_{1,3}$ within TR1, and $D_{2,1}$, $D_{2,2}$, and $D_{2,3}$ within TR2, and the current locations of the delivery vehicles 20 to the tour routing system 50 via a transmitting means and a mobile radio network (e.g., the transceiver 59 over the communications network 80). The tour routing system 50 compares the planned tour routes TR1 and TR2, current vehicle locations, maps and traffic information with internal collaborative tour routing algorithms stored in the system 50, or alternatively, communicates with an external collaborative tour routing system 100 over the communications network 80, to optimize the tour routes TR1 and/or TR2 to a more ideal and efficient route using collective information, as described above. To this end, the tour routing system 50 can use location and/or position data of multiple delivery vehicles 20 from, for example, a network of global positioning satellites (GPS) 90, to calculate a current location of the delivery vehicles 20 and calculates the speed of the vehicles 20 therefrom. In one embodiment, the tour routing system 50 communicates with the external collaborative tour routing system 100 configured and operating in accordance with the system and methods disclosed in commonly owned, U.S. patent application Ser. No. 16/214,823, titled "System and Method for Reducing Delays in Road Traffic," filed with the U.S. Patent and Trademark Office on Dec. 10, 2018, and which claims priority to Swiss Patent Application No. 01501/17, filed on Dec. 11, 2017, and European Patent Application No. 18405020.1, filed on Oct. 23, 2018. The disclosure of this U.S. patent document is incorporated by reference herein in its entirety.

In one embodiment, the tour routes TR 54E of individual delivery vehicles 20 are optimized on the basis of the loading zones 24. For example, a destination address 42 for a large-volume goods shipment 40 in a loading zone 24 with difficult access in the delivery vehicle 20 is planned for later in the tour route TR when the goods shipment 40 is freely accessible to unload by the driver 70, who therefore has no additional work shifting other goods shipments 40 around in the cargo area 22. Preferably, the tour planning systems 50 calculates round trips for the delivery vehicles 20, for example, determines tour routes TRs with identical starting and finishing points.

In accordance with the present invention, the loader 30 and/or the driver 70 and unloader of the respective delivery vehicle 20 advantageously know the positions of the goods shipments 40 in the loading zones 24 of the cargo area 20. These positions are signaled or displayed to them electronically by the tour routing system 50 activating the corresponding indicating unit 28 of the loading zone 24 (e.g., one of loading zones 24A to 24L) so that searching for the goods shipments 40 at the destination address 42 upon arrival for unloading is substantially minimized, if not eliminated, and the driver 70 or unloader can access the goods shipments 40 to be unloaded directly. In one example embodiment, the cargo area 22 is divided into twelve (12) loading zones 24 (e.g., loading zones 24A to 24L) that are assigned to racks in the cargo area 22, for example in two levels. The tour routing system 50 assigns the scatter values 26 to distribute one hundred twenty (120) goods shipments 40 (e.g., packages) uniformly between these twelve loading zones 24, e.g., ten (10) packages within each of the loading zones 24A to 24L. At arrival at a destination address 42, the driver 70 or unloader therefore does not have to search through all the one hundred twenty (120) goods shipments 40, as the search is limited to ten (10) goods shipments 40 that are located in one loading zone 24 signaled by the electronic activation of the indicated unit 28 of that one loading zones 24.

In an alternative embodiment to a manual unloading process, a robot system 32 with gripper arms 34 is assigned to each of the delivery vehicles 20 which can access the position data of the loading zones 24 for the vehicle 20 in the tour planning system 50, or the integrated navigation system 60, and allows automatic unloading of the delivery vehicle 20 at one or more destination addresses 42. The robot system 32 can be installed in the cargo area 22, for example, attached to the roof of the cargo area 22. The robot system 32 can alternatively be designed as an automatic drawer system or hatch system in the cargo area 22 which supports manual unloading and therefore, permits combined manual and automated unloading.

In the manner described, the driver 70 is offered both an optimized tour route for the shipment distribution, and the automatic loading system and unloading system enables the loader 30 and driver 70 or unloader to deliver the goods shipments to a consignee in a time-saving and effective manner.

Although described in the context of preferred embodiments, it should be realized that a number of modifications to these teachings may occur to one skilled in the art. By example, the teachings of the present invention are not intended to be limited to goods shipments and/or delivery vehicles of any particular type, that is, the present invention is not intended to be utilized by only certain goods or only certain commercial delivery vehicles, as any type of goods and delivery vehicles can benefit from the described systems and methods that provide static or dynamic assignment of loading zones within a delivery vehicle, dynamic and collaborative routing of one or more delivery vehicles along tour routes by taking into account traffic to positively direct delivery travel times and/or routes, and to signal goods locations upon arrival at a destination to improve unloading time and efficient. While the invention has been particularly shown and described with respect to preferred embodiments thereof, it will be understood by those skilled in the art that changes in form and details may be made therein without departing from the scope and spirit of the invention.

LIST OF REFERENCE SIGNS

10 Shipment Distribution System
12 One or more transport or delivery vehicles
   21 Vehicle identification code (barcode, RFID, QR code)
   22 Cargo area
      24 Plurality of loading zones (24A-24L of FIG. 2)
      26 Scatter value
      28 Visual or auditory indicating unit (LED, or audio sound)
      29 Position identification code (barcode, RFID, QR code)
30 Loader
   32 Robot
   34 Gripper
40 Plurality of goods shipments
   42 Plurality of destination addresses (1 for each goods shipment 40)
   44 Goods identification data (UPC barcode, RFID, QR code)
50 Tour planning system
   52 Processor or CPU
   54 Memory MEM 54
   56 Input-output controller
   58 Input devices 58A and output devices 58B
      58A Reader (barcode, radio frequency (RFID), quick response (QR) code)
   59 Transceiver
60 Navigation system (one per vehicle 20)
70 Driver of vehicle 20
80 Communications network
91 GPS
100 Collaborative tour routing system
TR Tour route (TR1, TR2 of FIG. 1)
   Origin ($O_{1,2}$ of FIG. 1)
   D Destination ($D_{1,1}, D_{1,2} \ldots D_{2,1}, D_{2,2} \ldots$ of FIG. 1)

What is claimed is:

1. A shipment distribution system, comprising:
a plurality of goods shipments, each of the goods shipments having goods identification data and a destination address;
one or more delivery vehicles, each of the delivery vehicles having a vehicle identification code and a cargo area divided into a plurality of loading zones, each of the plurality of loading zones having a position identification code and being capable of storing at least one or more of the plurality of goods shipments therein;
a tour planning system comprising a planning processor, planning memory operably coupled to the planning processor, and planning input devices and planning output devices operably coupled to the planning processor, wherein the planning processor receives loading information acquired by one of the planning input devices for goods shipments loaded on an identified one or more delivery vehicles and stores in the planning memory a volume of the cargo area of each of the identified one or more delivery vehicles in accordance with the acquired loading information including the goods identification data of loaded goods shipments, the vehicle identification code of each of the identified one or more delivery vehicles, and the position identification code of each of the plurality of loading zones of the cargo area corresponding to where the loaded goods shipments are placed within the plurality of loading zones of each of the identified one or more delivery vehicles; and
a navigation system located in at least one of the one or more delivery vehicles, the navigation system communicatively linked to or integrated with the tour planning system, the navigation system comprising a navigation processor, navigation memory operably coupled to the navigation processor, and navigation input devices and navigation output devices operably coupled to the navigation processor, the navigation output devices include an indicating unit for each of the plurality of loading zones activatable by the navigation processor to identify one of the plurality of loading zones corresponding to the loaded goods shipment to be unloaded upon arrival at the destination address of the loaded goods shipment;
wherein the planning processor of the tour planning system is configured to calculate a planned tour route for each of the one or more delivery vehicles and to transmit the planned tour route to the navigation system of each of the one or more delivery vehicles, the planned tour route calculated according to the positions of each of the loaded goods shipments in the cargo area of each of the identified one or more delivery vehicles and the destination address thereof;
wherein the navigation processor of each respective one of the one or more delivery vehicles receives the planned tour route from the tour planning system and determines a scheduled tour route for the respective delivery vehicle in accordance with the planned tour route and a sequence of anticipated arrivals at and between the destination addresses of the goods shipments within the cargo area of the respective delivery vehicle;
wherein the planning processor of the tour planning system and the navigation processor of a respective one of the one or more delivery vehicles change the scheduled tour route of the respective delivery vehicle in response to changing traffic situations, order situations, a current location and an anticipated next destination of the respective delivery vehicle, and collective information within the tour planning system including utilization and capacity of tour routes by a plurality of the one or more delivery vehicles; and
wherein the navigation processor of each respective one of the one or more delivery vehicles, upon arrival at the destination address for each of the loaded goods shipments, activates the indicating unit of the position within one of the plurality of loading zones in the cargo area of the respective one of the one or more delivery vehicles storing the loaded goods shipment to facilitate unloading and delivery thereof.

2. The shipment distribution system according to claim 1, wherein the planning processor of the tour planning system calculates the planned tour routes of each of the one or more delivery vehicles to optimize travel times of each of the one or more delivery vehicles.

3. The shipment distribution system according to claim 1, wherein the positions of the goods shipments in the loading zones of the cargo area are specified by a loader using a reader as the one of the planning input devices to acquire the loading information including the position identification code attached to each of the plurality of loading zones and the goods identification data attached to each of the plurality of goods shipments and to transmit the loading information to the tour planning system.

4. The shipment distribution system according to claim 1, wherein one of the planning input devices is comprised of at least one electronic display unit with an input device with which a loader acquires the loading information.

5. The shipment distribution system according to claim 1, wherein the shipment distribution system further comprises a robot system into which the loading information is entered, and wherein the robot system operates to an identified one of the plurality of loading zones of the cargo area, and to selectively unload the goods shipments from the identified one of the plurality of loading zones of the cargo area at the respective destination address with grippers.

6. The shipment distribution system according to claim 1, wherein the planning processor utilizes the collective information within the planned tour routes for the plurality of the one or more delivery vehicles to reserve different tour routes for a subset of the plurality of one or more delivery vehicles having loaded goods shipments with similar destination addresses.

7. The shipment distribution system according to claim 1, wherein the planning processor assigns a same scatter value to each of the loaded goods shipments having a same destination address.

8. The shipment distribution system according to claim 7, wherein the scatter values and respective loaded goods thereof are distributed uniformly between the plurality of loading zones of the cargo area of each of the identified one or more delivery vehicles.

9. The shipment distribution system according to claim 1, wherein one of the planning input devices and one of the navigation input devices each further include a receiver operatively coupled to a network of global positioning satellites to receive a current location of each of the one or more delivery vehicles in the shipment distribution system.

10. The shipment distribution system according to claim 9, wherein the planning processor of the tour planning system uses the received location information to determine a speed of each of the one or more delivery vehicles in the shipment distribution system.

11. The shipment distribution system according to claim 1, wherein the indicating unit is comprised of at least one of a visual and an auditory indicating unit.

12. A method for distribution of goods shipments, the method comprising:
providing one or more delivery vehicles;
loading each of identified ones of the one or more delivery vehicles with a plurality of goods shipments;
storing, in a tour routing system, a volume of a cargo area of each of the identified ones of the one or more delivery vehicles, the volume including the plurality of goods shipments loaded in each of the identified ones of the one or more delivery vehicles and a destination address for each of the loaded goods shipments;
dividing, by the tour routing system, the cargo area of each of the identified ones of the one or more delivery vehicles into one or more loading zones, and assigning the loaded goods shipments to positions within the one or more loading zones;
planning, by a planning processor of the tour routing system, a planned tour route for each of the identified ones of the one or more delivery vehicles according to the positions of the loaded goods shipments within the one or more loading zones and the destination addresses of the loaded goods shipments;
transmitting from the tour routing system the planned tour routes for each of the identified ones of the one or more delivery vehicles to a navigation system operating within each of the identified ones of the one or more delivery vehicles;
scheduling, by a navigation processor of the navigation system of a respective one of each of the identified ones of the one or more delivery vehicles, a scheduled tour route in accordance with the planned tour route and a sequence of anticipated arrivals at and between the destination addresses of the goods shipments within the cargo area of the respective delivery vehicle;
changing, by the planning processor and the navigation processor of the respective delivery vehicle, the scheduled tour route of the respective delivery vehicle in response to changing traffic situations, order situations, a current location and an anticipated next destination of the respective delivery vehicle, and collective information within the tour routing system including utilization and capacity of tour routes by a plurality of the one or more delivery vehicles; and
upon arrival at the destination address for each of the loaded goods shipments, activating, by the navigation processor of the respective delivery vehicle, an indicating unit for the position of the loading zone in the cargo area storing the loaded goods shipment to facilitate unloading and delivery thereof.

13. The method of claim 12, wherein the planned tour routes for each of the identified ones of the one or more delivery vehicles is planned to optimize a route based on the positions of the load goods shipments in the cargo area of each of the identified ones of the one or more delivery vehicles and the destination addresses of the loaded goods shipments.

14. The method of claim 12, wherein the tour routing system utilizes the collective information within the planned tour routes for the plurality of the one or more delivery vehicles to reserve different tour routes for a subset of the plurality of the one or more delivery vehicles having loaded goods shipments with similar destination addresses.

15. The method of claim 12, further comprising:
assigning a same scatter value to each of the loaded goods shipments having a same destination address.

16. The method of claim 15, wherein the scatter values and respective loaded goods thereof are distributed uniformly between the plurality of loading zones of the cargo area of each of the identified one or more delivery vehicles.

17. The method of claim 12, wherein the indicating unit, when activated, outputs at least one of a visual and an auditory signal.

18. The method of claim 12, further comprising:
receiving, by a receiver operatively coupled to the planning processor of the tour routing system and operatively coupled to a network of global positioning satellites, a current location of each of the one or more delivery vehicles.

19. The method of claim 18, wherein the planning processor of the tour planning system determines a speed of each of the one or more delivery vehicles from the received current location.

* * * * *